United States Patent [19]

Yachabach et al.

[11] 4,264,787

[45] Apr. 28, 1981

[54] HAZARDOUS VOLTAGE PROTECTION CIRCUIT

[75] Inventors: Gerald J. Yachabach; Gary L. Eisenhauer, both of Lakeland, Fla.

[73] Assignee: Akzona Incorporated, Asheville, N.C.

[21] Appl. No.: 108,921

[22] Filed: Dec. 31, 1979

[51] Int. Cl.³ .............................................. H04M 1/00
[52] U.S. Cl. .................................. 179/81 R; 179/184; 361/91; 361/110
[58] Field of Search ...................... 361/88, 89, 91, 110, 361/187; 340/662, 661; 179/81 R, 184, 175.3 F, 186, 84 R, 78 A; 307/354

[56] References Cited

U.S. PATENT DOCUMENTS

| | | | |
|---|---|---|---|
| 3,558,830 | 1/1971 | Bender | 179/184 |
| 3,836,790 | 9/1974 | Becker | 361/89 |
| 3,925,624 | 12/1975 | Earle et al. | 179/81 R |
| 3,944,889 | 3/1976 | Conway | 361/110 |
| 4,079,211 | 3/1978 | Janssen | 179/81 R |
| 4,145,579 | 3/1979 | Angner et al. | 179/81 R |
| 4,167,654 | 9/1979 | Bolus et al. | 179/81 R |
| 4,194,230 | 3/1980 | Danford | 179/78 A |

Primary Examiner—Gerald L. Brigance
Attorney, Agent, or Firm—Francis W. Young; David M. Carter

[57] ABSTRACT

A circuit for protecting telephone lines from AC hazardous voltages. The circuit includes an amplitude discriminator triggered at a predetermined voltage level connected to the telephone lines, and providing an output pulse for each zero voltage crossover of the hazardous voltage. A digital pulse counter counts a predetermined number of output pulses from the amplitude discriminator, which in turn operates a switch after the predetermined number of pulses are counted, opening the telephone lines between the central office and the telephone instrument until the hazardous voltage has been removed from the lines.

10 Claims, 1 Drawing Figure

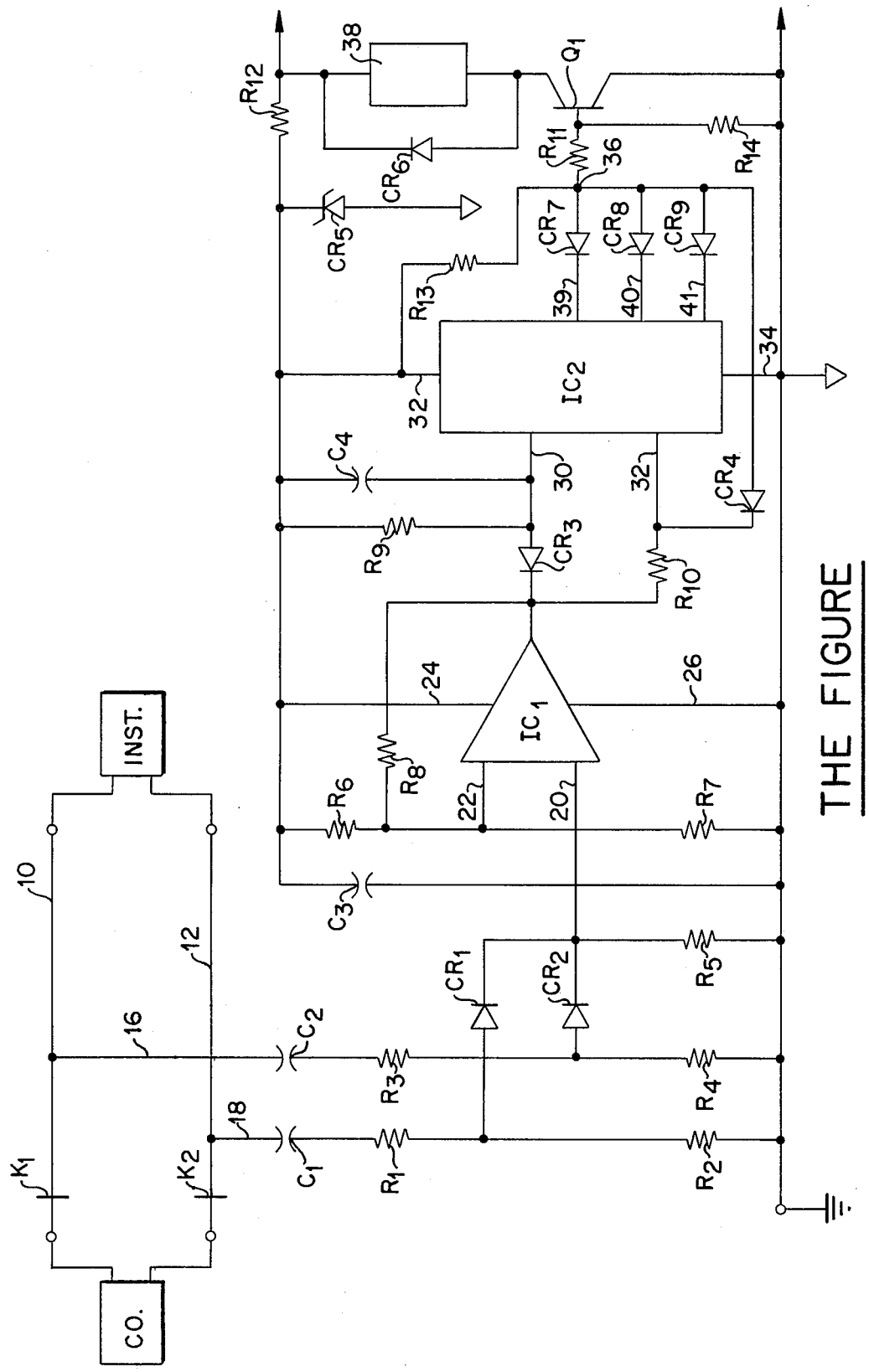
THE FIGURE

HAZARDOUS VOLTAGE PROTECTION CIRCUIT

BACKGROUND OF THE INVENTION

This invention relates to a circuit for protecting telephone lines from hazardous voltages. More particularly, it relates to a digital circuit which is substantially frequency independent and which protects telephone lines from certain hazardous voltages.

The difficulties caused by hazardous voltages, such as lightning and other voltages such as AC line voltages, on telephone lines has long been a problem in the telephone industry. Exposure of delicate equipment to these voltages, particularly solid state circuits, can ruin this equipment, and, even more importantly, can expose users of this equipment to these dangerous high voltages. The problems of very high voltage exposures, such as lightning, have been solved substantially in the use of lightning arresters connected directly between the telephone lines and ground. A lightning arrester normally consists of a high voltage breakover gas tube, commonly called a network protection device, such as the one disclosed in U.S. Pat. No. 3,725,613, assigned to the Rochester Telephone Corporation. However, the use of these voltage gas tubes will not provide protection for lower voltages, such as 120 volt AC, which can come on the telephone line due to, for example, a power line coming in contact with the telephone line. While this type of situation occurs quite often, it has not been adequately dealt with.

It has been suggested that one could use a threshold detector across the tip and ring of telephone line and further connected to a phase lock loop circuit in order to detect a specific frequency on the line and then open or close the telephone line circuit in response to the specific frequency as detected by the phase lock loop circuit. However, it has been found that this approach has many drawbacks.

One problem is that a phase lock loop circuit is programmed to a specific frequency, thus hazardous voltages on the line of different frequencies would not even be detected by this circuit, thus exposing the customer to these hazardous voltages. Furthermore, this phase lock loop circuit must be pre-programmed by a skilled technician and tuned to a specific frequency in order to be operable at all. Since hazardous voltages occur at various frequencies, this device has found little acceptance.

Similar circuits have been provided to isolate the central office from customer equipment for purposes of testing faults in the line. Examples of such circuits are shown in U.S. pat. No. 3,766,336, issued to Wikholm; U.S. Pat. No. 3,636,280, assigned to General Telephone Company of California; and U.S. Pat. No. 3,773,986, assigned to Communication Systems Corporation. However, none of these patents sense hazardous voltages on the line, but are only responsive to a specific signal sent from the central office in order to open the line so that the central office can test its line to see if a particular fault is customer related or telephone-operating company related.

OBJECTS OF THE INVENTION

It is, therefore, one object of this invention to provide an improved hazardous voltage protection device.

It is another object to provide a circuit for detecting and screening certain alternating voltages which may exist on the conductors of a circuit which needs protecting.

It is still another object of this invention to provide a hazardous voltage protection circuit which utilizes reliable digital circuitry for opening the telephone line when a hazardous voltage is detected.

It is still another object of this invention to provide a hazardous voltage protection circuit which is substantially frequency insensitive.

SUMMARY OF THE INVENTION

In accordance with one form of this invention, there is provided a circuit for detecting and screening certain alternating voltages which may exist on a conductor. The circuit includes a pair of input leads connecting the circuit to a pair of conductors, which may receive certain alternating voltages, and an amplitude discriminator or analog threshold detector, having first and second input terminals and an output terminal. The circuit input leads are connected to one of the amplitude discriminator input terminals and a threshold voltage source is connected to the other input terminal of the amplitude discriminator. The amplitude discriminator will provide output only upon detection of a signal on the line of a predetermined amplitude. The output terminal of the amplitude discriminator is connected to a pulse counter circuit, which counts the zero crossovers of the signal coming from the amplitude discriminator. The pulse counter will provide an output signal only after counting a predetermined number of pulses from the amplitude discriminator. The counter output signal will trigger a switch which opens and closes the conductor circuit path, while the voltages are present on the line. Thus, a substantially frequency insensitive hazardous voltage protection circuit is provided.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawing in which:

The FIGURE is a schematic circuit diagram showing one form of the present invention.

DESCRIPTION OF THE PREFERRED EMBODIMENT

Referring now more particularly to the FIGURE, there is provided tip conductor 10 and ring conductor 12. As shown in the FIGURE, one side of each of these conductors is adapted to be connected to the telephone central office, and the other side is adapted to be connected to a telephone instrument. It is along these tip and ring lines where hazardous voltages may come in contact therewith, with the possibility of causing damage to the equipment in the central office, or becoming a shock hazard to the customer who is using the instrument. It is, therefore, necessary to provide a mechanism for opening these circuits and the hazardous voltage protector circuit 14 provides this result by opening and closing relay contacts K1 and K2, which are respectively in series with the tip and ring conductors. The tip and ring conductors 10 and 12 are connected to the hazardous voltage protector circuit 14 through input leads 16 and 18, respectively. Capacitors C1 and C2 are connected to the input leads 16 and 18 ir order to block any DC signals which may be present on the tip and ring conductors so as not to falsely trigger the hazardous voltage protector circuit.

Resistors R1 and R2 are connected in series with the capacitor C1 and to ground, and resistors R3 and R4 are also connected in series to capacitor C2 and to ground, forming voltage divider networks to limit the voltage levels compatible with the remaining digital circuitry of the voltage protector circuit. Diodes CR1 and CR2 are respectively connected to the midpoints of these voltage dividers, and are further connected to the input terminal 20 of amplitude discriminator IC1, which, in this embodiment, may be an analog threshold detector or an operational amplifier. The diodes CR1 and CR2 are poled such as to form an OR gate, so that signals from either the tip or the ring conductors are provided at the input terminal 20 of operational amplifier IC1. Resistor R5 is connected from the outputs of this OR gate to ground, so that the proper voltage level may be developed at input terminal 20. The reference input terminal 22 of operational amplifier IC1 is connected to voltage divider network from R6 and R7, which is connected through resistor R12 to a twenty-four (24) volt supply and to ground, for providing a threshold voltage for signals on input terminal 20 so as to preclude certain low level signals.

In the preferred embodiment, the voltage level limitation is fifty (50) volts rms. R8 is connected from output terminal 28 of operational amplifier IC1 to its reference input 22 to provide positive feedback, giving a hysteresis effect. This precludes double-pulsing due to noise which may be present on the positive going transitions on input terminal 20 of IC1. Capacitor C3 is connected from resistor R12 to ground to filter the power supply. Power for operational amplifier IC1 is provided by its connection through terminal 24 to the supply resistor R12 and through terminal 26 to ground. The output terminal 28 of operational amplifier IC1 provides two functions; one being to couple signals through negatively poled diode CR3 to reset input terminal 30 of digital counter IC2; furthermore, to transmit square wave signals through resistor R10 to the clock input terminal 32 of the counter. The output 28 of operational amplifier IC1 will provide a clock pulse for each zero crossover of the hazardous voltage which is occurring on tip and/or ring conductors 10 and 12. Capacitor C4 and resistor R9 are connected in parallel from reset input terminal 30 of IC2 to the power supply, resistor R12. This network provides a time constant sufficiently long to preclude the resetting of counter IC2 between successive AC signal pulses. However, the time constant of this network is sufficiently short to permit the counter to reset after the termination of the hazardous voltage signal.

In the preferred embodiment, this time out is approximately 400 milliseconds after the AC signal on the tip or ring conductors are removed. Power for the counter IC2 is provied by the connection of terminal 32 to power supply resistor R12 and by the connection of terminal 34 to ground. IC2 may be programmed using outputs 39, 43 and 41 in combination to count any number of clock pulses and provide an output signal on output mode 36 when such predetermined number of clock pulses have been counted. In this embodiment, IC2 was programmed to count fifty-six (56) pulses before providing a logic one output pulse on mode 36.

Diode CR4 is connected from output mode 36 of IC2 to IC2 input clock terminal 32 to restrict further clock pulses after an output signal is received on 36. Output mode 36 is connected through resistor R11 to the base of transistor Q1. The emitter of transistor Q1 is connected to ground, and its collector is connected through relay coil 38 to source of twenty-four (24) volt supply. A protection diode CR6 is connected in parallel with winding 38. R13 is connected to resistor R12 to provide a current source to a logic 1 signal level (commonly known as a pull-up resistor). R14 is connected between the base and emmitter of Q1, to assure that it turns off when mode 36 goes to a logic zero. Zener diode CR5 is connected from one side of power resistor R12 to ground for limiting the voltage supply. Relay coil 38 is magnetically coupled to relay contacts k1 and K2 for opening and closing the top and ring circuit upon the proper count perceived on IC2.

The circuit described above operates in the following fashion: When an AC voltage is being impressed upon tip and ring conductors 10 and 12 of the alternating type, it is received through diodes CR1 and CR2 at the input terminal 20 of operational amplifier IC1. If this hazardous voltage is of a sufficient amplitude, operational amplifier IC1 will provide a square wave output at 28 for each zero crossover of the AC hazardous voltage on the tip or ring conductors. The negative output terminal 28 will reset counter IC2 and the positive going pulses from output terminal 28 will be counted by counter IC2 until its preprogrammed count has been achieved. In that case, a positive output signal will occur at counter output terminal 36. Feedback diode CR4 will then provide a high signal on clock input terminal 32, causing the counter to stop counting even though there are more pulses occurring on the output of operational amplifier IC1. This positive signal on the output of the counter IC2 will forward bias transistor Q1 into its conductive state, drawing current through the coil 38 of the relay. Relay contacts K1 and k2 are normally closed while there is no current through its corresponding coil 38; however, when the current does flow through coil 38, these relay contacts open, thus, the tip and ring conductors are open circuited. Therefore, current does not flow in the telephone circuit between the central office and the instrument, thereby protecting the central office and the instrument user from hazardous voltages. When the hazardous voltage is removed from the tip and ring conductors, time constant circuit C4 and R9 will discharge, causing the counter IC2 to reset, thus removing the positive pulse on its output 36, causing transistor Q1 to turn off, thus stopping the current flow through coil 38. This permits the relay contacts K1 and K2 to close, again establishing a circuit relation between the central office and the instrument.

The circuit described above has been built and operated with components of the following values:

Resistors

R1—400K
R2—100K
R3—470K
R4—100K
R5—1 megaohm
R6—100K
R7—100K
R8—7 megaohms
R9—1 megaohm
R10—100K
R11—100K
R12—10K

R13—22K
R14—100K

Capacitors

C1—0.1 microfarads—400 volts
C2—0.1 microfarads—400 volts
C3—1.0 microfarad—10 volts
C4—0.1 microfarad—15 volts

Diodes

CR1—IN4148
CR2—IN4148
CR3—IN4148
CR4—IN4148
CR5—12 Volt, Zener IN4742
CR6—IN4004
CR7—IN4148
CR8—IN4148
CR9—IN4148

Operational Amplifier

IC1—741 OPAMP

Digital Counter

IC2—4024 Counter

Transistor

Q1—2N5306 Transistor

Relay Coils and Contacts

38, K1, K2—700 ohm 24 Volt DC two form B

We claim:

1. A circuit for detecting and screening certain alternating voltages which may exist on a conductor, said circuit comprising:
   a pair of circuit input leads connecting said circuit to a pair of conductors which may receive the alternating voltages;
   an amplitude discriminator circuit having first and second input terminals and an output terminal; said first input terminal connected to at least one of said circuit input leads; said second input terminal connected to a reference voltage supply;
   a pulse counter circuit connected to the output terminal of said amplitude discriminator, said amplitude discriminator providing an output pulse for each zero crossing of the signal of a predetermined amplitude on its first input terminal, said counter providing an output signal in response to a predetermined number of pulses from said amplitude discriminator;
   a switch means responsive to the output of said counter for opening the circuit of at least one of the conductors, which is subject to the certain alternating voltages.

2. A circuit as set forth in claim 1, wherein said amplitude discriminator provides digital output pulses and wherein said counter is a digital counter.

3. A circuit as set forth in claim 1, wherein said amplitude discriminator is an analog threshold detector.

4. A circuit as set forth in claim 1, wherein said switch means includes a transistor and a relay coil and contacts, said contacts being connected in series with said conductors and said relay coil being responsive to said transistor.

5. A circuit as set forth in claim 1, further including an OR gate connected to the first input of said operational amplifier and to said pair of circuit input leads.

6. A circuit as set forth in claim 2, further including a timing circuit means for providing a reset to the reset input after a hazardous voltage has been removed from the conductors, but not between the pulses from said amplitude discriminator.

7. A circuit as set forth in claim 2, further including a feed-back circuit from the output of said counter to the clock input for disabling said counter after a predetermined number of counts have been received.

8. A circuit as set forth in claim 1, further including a feed-back circuit from the output of said amplitude discriminator to its reference input, giving a hysteresis effect, preventing double pulsing due to possible noise on the first input terminal to said amplitude discriminator.

9. A circuit as set forth in claim 1, wherein said circuit is substantially frequency independent of said certain alternating voltages.

10. A hazardous alternating voltage protector circuit comprising:
    means for connecting said circuit to the tip and ring conductors of the telephone line;
    an analog threshold detector, having one of its input terminals connected to said means for connecting;
    the output of said detector providing pulses in response to zero crossovers of an alternating voltage above a predetermined threshold received on said input;
    a digital counter circuit connected to the output of said detector for counting the pulses from said detector;
    a reset input connected to said counter;
    a timing circuit connected to said reset input for resetting said digital counter after the termination of said alternating voltages, but not resetting the counter between pulses due to said alternating voltages;
    a transistor connected to the output of said counter, said transistor further connected to a relay, said relay including coils and contacts, said contacts are connected in series with the tip and ring conductors; said relay contacts being open upon the conduction of said transistor after the accumulation of a predetermined number of counts in said counter.

* * * * *